United States Patent [19]
Fukuhara

[11] Patent Number: 5,337,779
[45] Date of Patent: Aug. 16, 1994

[54] AUTOMATIC DRAIN DEVICE

[75] Inventor: Hiroshi Fukuhara, Yokohama, Japan

[73] Assignee: Kabushiki Kaisha Fukuhara Seisakusho, Yokohama, Japan

[21] Appl. No.: 615,571

[22] Filed: Nov. 19, 1990

[30] Foreign Application Priority Data

May 23, 1990 [JP] Japan .................. 2-54184[U]

[51] Int. Cl.⁵ .......................... F16K 31/02; F16T 1/00
[52] U.S. Cl. ................................. 137/187; 137/204; 137/392
[58] Field of Search ............. 137/187, 204, 392, 195, 137/177; 73/304 R, 304 C; 307/118; 340/618, 620; 361/178

[56] References Cited

U.S. PATENT DOCUMENTS

| | | | |
|---|---|---|---|
| 2,564,873 | 8/1951 | Wright | 137/187 |
| 4,119,116 | 10/1978 | Johnson et al. | 137/387 |
| 4,261,382 | 4/1981 | Bridges | 137/204 |
| 4,336,821 | 6/1982 | Frantz et al. | 137/392 |
| 4,453,893 | 6/1984 | Hutmaker | 417/279 |
| 4,505,427 | 3/1985 | Bridges | 137/204 |
| 4,974,626 | 12/1990 | Koch | 137/187 |

FOREIGN PATENT DOCUMENTS

| | | |
|---|---|---|
| 59-9190 | 1/1984 | Japan . |
| 59-13196 | 1/1984 | Japan . |
| 1124499 | 8/1989 | Japan . |
| 1149096 | 10/1989 | Japan . |

Primary Examiner—George L. Walton
Attorney, Agent, or Firm—Vineet Kohli

[57] ABSTRACT

An automatic drain device in an air compressor system includes an electrode sensor in a liquid collection cell. An electronic control detects an electrical change in the electrode sensor resulting from contact with liquid in the liquid collection cell and energizes a drain valve for a predetermined time effective to drain the liquid collection cell. A cycle timer triggers the energization of the drain valve when the electrode sensor fails to provide the required electrical change for a predetermined cycle time. Test inputs permit driving the electronic control to simulate sensing of liquid, and also permit energization of the drain valve without involving the remainder of the electronic control.

8 Claims, 4 Drawing Sheets

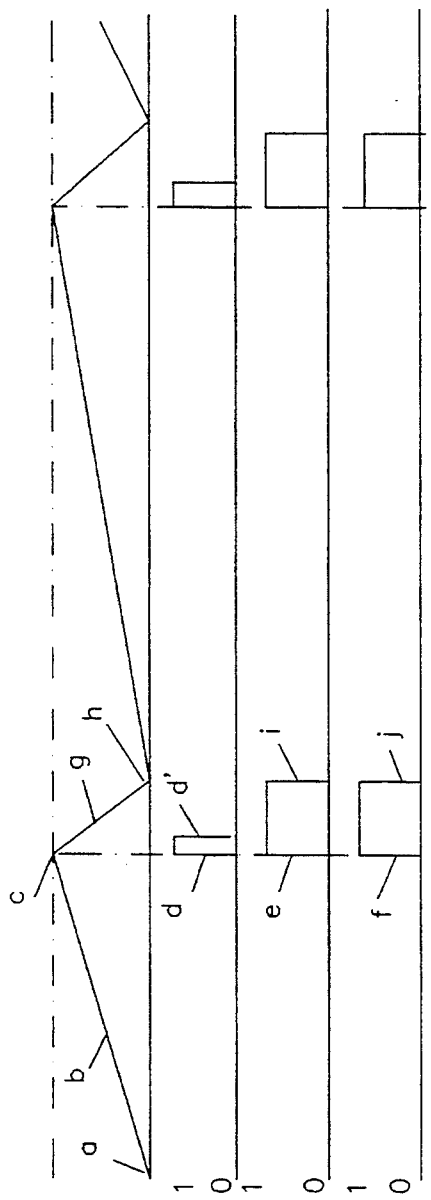
FIG. 2A LIQUID LEVEL
FIG. 2B FLOAT SWITCH
FIG. 2C TIME-CONSTANT CIRCUIT
FIG. 2D DRAIN VALVE

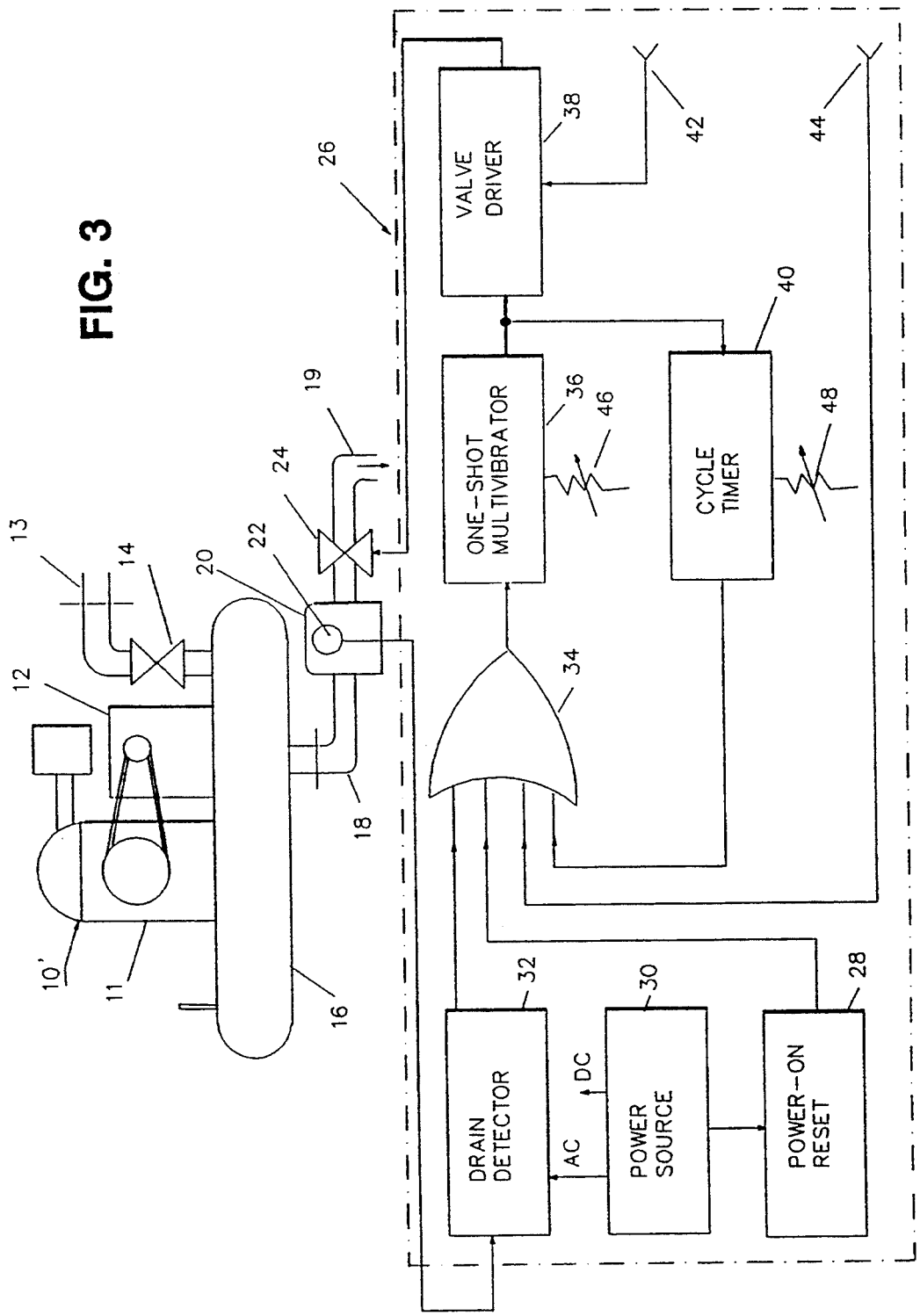

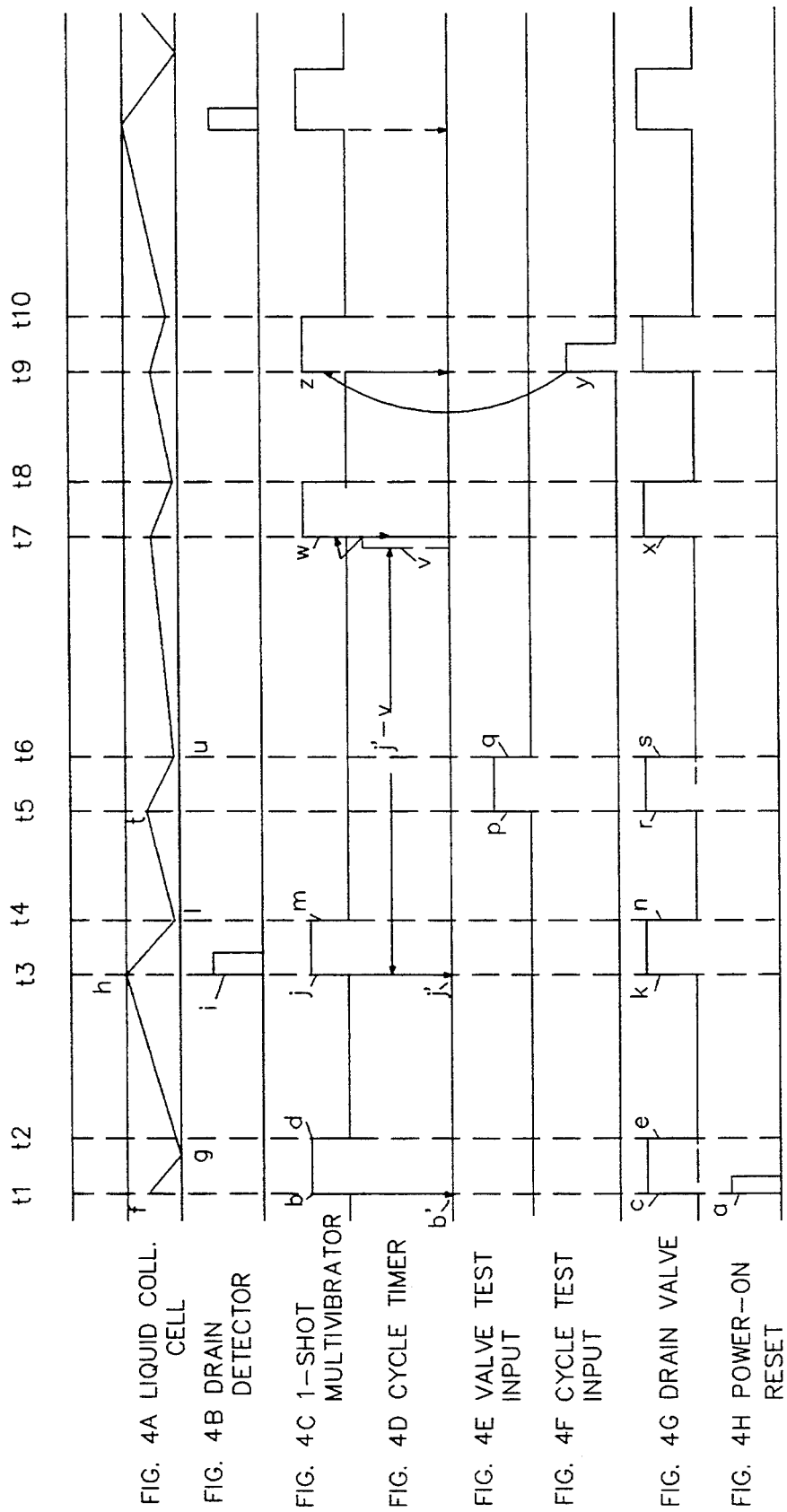

AUTOMATIC DRAIN DEVICE

BACKGROUND OF THE INVENTION

The present invention relates to an automatic drain device to discharge liquid accumulating in a high pressure air tank of an air compressor.

Typical applications for an air compressor supplying high-pressure air, generally around 7 kg/cm$^2$, are a high-pressure air drill, a tacking instrument, a rock drill, a punching machine, an air hammer, an air turbine, and the like. In applications of this type, the air compressor usually stores a reserve of the high-pressure air in an air tank to minimize fluctuations of output air pressure.

Oil and water that separates from the compressed air collects at the bottom of the air tank as liquid that must be removed periodically during operation.

Air compressors incorporating automatic liquid discharge capability are well known. According to prior art, these drain devices use a float chamber and a drain valve in a drain pipe path below the air tank, and a controller to automatically open the drain valve to drain liquid that gravitates from the air tank into the float chamber. A mechanically actuated float level switch within the float chamber sends a signal to a time-constant circuit in the controller when the liquid inside the float chamber reaches a certain level. Upon receiving this signal, the time-constant circuit activates a valve drive circuit, which in turn opens the drain valve for a preset period to drain the liquid in the float chamber. At the end of the preset period the energizing signal to the valve drive circuit is removed and the drain valve closes. This sequence is repeated each time the liquid level in the float chamber rises sufficiently to activate the float level switch.

Problems that may be encountered in an automatic drain device using the prior art are:

(1) The float chamber must be large enough to accommodate a mechanically actuated float level switch that is responsive to liquids, including oil, which have high viscosity. This increases the size of the air compressor system.

(2) The float level switch usually consists of a float and a switch connected by a mechanical part, such as a lever, which may become corroded by the liquid in the float chamber.

(3) The variability of the viscosity of the liquid in the float chamber can affect the reliability of the float to always detect the same level of liquid in the chamber. This can be particularly troublesome in cold environments where the viscosity of the liquid increases. Accumulation of residue in the float chamber may also affect the reliability of the float level switch.

The questionable reliability of automatic drain devices using the prior art increases the possibility of liquid remaining in the air tank and the consequent difficulty in continuously supplying clean, high pressure air from the air compressor system.

OBJECTS AND SUMMARY OF THE INVENTION

It is an object of the invention to provide an automatic drain device for high pressure air compressor systems that improves drain reliability and operation through the use of electrode level detection and improved controller circuitry.

It is a further object of the invention to provide an automatic drain device which actuates a drain valve in response to a sensor output when the condensed liquid attains a predetermined level. A cycle timer actuates the drain valve if the sensor output fails to occur within a predetermined time.

The invention provides a liquid activated electrode sensor contained within a liquid collection cell, an electronically controlled drain valve in a drain pipe path at the bottom of an air tank of a high pressure air compressor system, and an electronic controller. The electronic controller consists of: a power-on reset circuit, a power source, a drain detector circuit, an OR gate, a one-shot multivibrator, a cycle timer, and a vane driver. In addition, two test signal inputs are available: the first to check only the valve driver and drain valve for proper operation, the second to check for normal cycle operation.

The power source provides a bias for the drain detector circuit and the liquid level electrode sensor, and direct-current voltages for the logic and drive circuitry in the controller. The power-on reset circuit initiates a drain cycle when power is applied to the controller. When a preset liquid level is sensed by the electrode sensor, a change in electrode sensor alternating-current bias causes the drain detector circuit to send a signal to the one-shot multivibrator through the OR gate. The one-shot multivibrator responds to the input by supplying a drive signal of preset duration to the input of the valve driver. The valve driver actuates the drain valve to drain accumulated liquid for a period corresponding to the duration of the active signal from the one-shot multivibrator. The leading edge of the output signal from the one-shot multivibrator also resets the cycle timer which then begins to count toward the end of a preset period of time. The end of each cycle timer period pulses the one-shot multivibrator through the OR gate, causing a preset drain period from the liquid collection cell, providing that the cycle timer has not been reset in the interim by a liquid sense condition. Periodic drain backup in this manner automatically evacuates the liquid collection cell even when the liquid level in the cell does not reach the electrode sensor level within the preset period of time, or in the event of electrode sensor failure.

Briefly stated, an automatic drain device in an air compressor system includes an electrode sensor in a liquid collection cell. An electronic control detects an electrical change in the electrode sensor resulting from contact with liquid in the liquid collection cell and energizes a drain valve for a predetermined time effective to drain the liquid collection cell. A cycle timer triggers the energization of the drain valve when the electrode sensor fails to provide the required electrical change for a predetermined cycle time. Test inputs permit driving the electronic control to simulate sensing of liquid, and also permit energization of the drain valve without involving the remainder of the electronic control.

According to an embodiment of the invention, there is provided an automatic drain device for automatically draining accumulated liquid from an air tank, comprising: a liquid collection cell, means for permitting the liquid to drain into the liquid collection cell, an electrode sensor in the liquid collection cell, an externally controllable drain valve, the drain valve being effective, when energized, to drain the liquid collection cell, the electrode sensor including means for producing a predetermined change in an electrical property of the electrode sensor when the electrode sensor is contacted by the liquid, means for sensing the change in an electrical property, and for producing an output signal in response thereto, energizing means, responsive to the output signal, for energizing the drain valve for a first predetermined time, and cycle timer means, responsive to the non-occurrence of the output signal for at least a second predetermined time, to energize the drain valve for the first predetermined time.

The above, and other objects, features and advantages of the present invention will become apparent from the following description read in conjunction with the accompanying drawings, in which like reference numerals designate the same elements.

BRIEF DESCRIPTION OF THE DRAWINGS

FIGS. 2A through 2D are timing diagrams of automatic drain operations using prior art.

FIG. 3 is a block diagram according to an embodiment of the invention used in an air compressor system.

FIGS. 4A through 4H are timing diagrams of automatic drain operations using the invention.

DETAILED DESCRIPTION OF A PREFERRED EMBODIMENT

Figure 1:
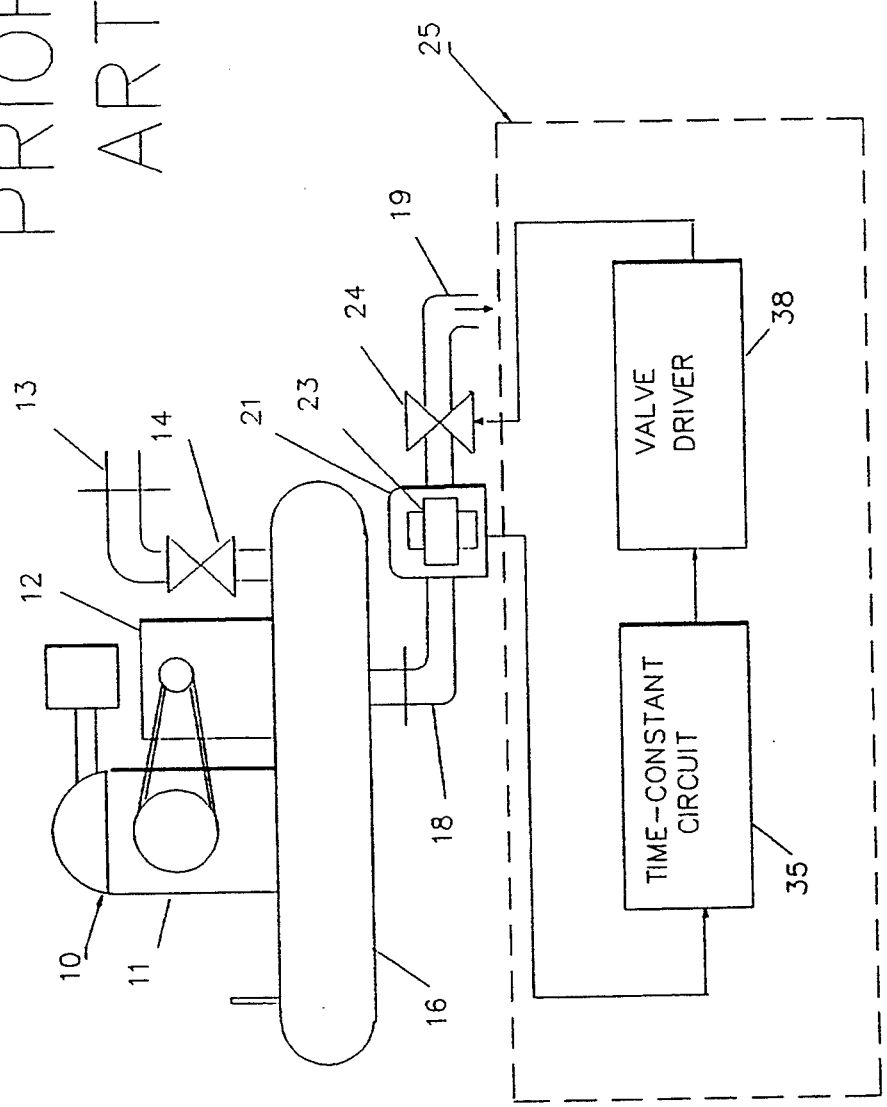
FIG. 1 is a block diagram of an air compressor system using prior art to automatically drain liquid from the air tank.

Referring to FIG. 1, an air compressor system 10 with automatic drain control according to the prior art includes an air compressor 11 driven by a motor 12. Pressurized air developed by air compressor 11 is stored in an air tank 16 and supplied to an external device through an output control valve 14 and an output pipe 13. A drain pipe 18 disposed below air tank 16 allows liquid accumulating in air tank 16 to gravitate to a float chamber 21 containing a float switch 23 to detect the level of fluid in float chamber 21. When the level of fluid in float chamber 21 rises sufficiently, float switch 23 sends a signal to a time-constant circuit 35 in a control module 25. Time-constant circuit 35 energizes a valve driver 38 for a preset period of time, which in turn opens a drain valve 24 in drain pipe 18 path to allow discharge of the liquid in float chamber 21 through a discharge pipe 19. The time period that drain valve 24 is active is sufficient to discharge all of the liquid from float chamber 21.

Referring to FIGS. 2A–2D, while air compressor system 10 runs, beginning at point a in FIG. 2A, the liquid level in float chamber 21 rises along a line b, thus causing float switch 23 to rise accordingly. When the liquid level reaches a certain height as show at point c in FIG. 2A, the contacts of float switch 23 close, sending an activating signal (d—d' in FIG. 2B) to time-constant circuit 35. Time-constant circuit 35 generates a fixed period signal, as shown at e–i in FIG. 2C, that causes valve driver 38 to open drain valve 24 for a corresponding period to drain liquid from float chamber 21. The discharging liquid, as shown by line g in FIG. 2A, opens float switch 23 contacts and attains a minimum level at point h in FIG. 2A. At point i in FIG. 2C, the activating signal level from time-constant circuit 35 to valve driver 38 is removed, causing drain valve 24 to close. This drain sequence is repeated each time the liquid level in float chamber 21 rises sufficiently to actuate float switch 23.

Referring to FIG. 3, an air compressor system 10' utilizing automatic drain of accumulated liquid according to the present invention, includes an air compressor 11 driven by a motor 12, supplying air to an air tank 16. An output control valve 14 controls the discharge of air pressure through an output pipe 13 to devices using the pressurized air. A liquid collection cell 20 is disposed below air tank 16 to receive liquid condensed from the pressurized air in air tank 16. In addition to condensed liquid, particulate matter may also be contained in the condensate. An electrode sensor 22 is disposed within liquid collection cell 20. An electronically actuated drain valve 24 controls the discharge of condensed liquid and particulate matter from liquid collection cell 20. Electronically actuated drain valve 24 responds to control signals from a controller 26 to enable automatic discharge of the liquid in liquid collection cell 20.

Controller 26 contains a power-on reset 28 feeding a reset signal to an OR gate 34 at initial application of power. A power source 30 produces AC and DC power used throughout controller 26. In particular, power source 30 applies power to power-on reset 28 and AC power to a drain detector 32. When the liquid level in liquid collection cell 20 rises sufficiently to come in contact with electrode sensor 22, the change detected by drain detector 32 causes it to emit a trigger pulse through OR gate 34. A one-shot multivibrator 36 receiving an output of OR gate 34 generates a fixed-width output pulse for application to a valve driver 38 and a cycle timer 40. A variable resistor 46 controls the width of the fixed-width output pulse of one-shot multivibrator 36. Valve driver 38 responds to the fixed-width output pulse from one-shot multivibrator 36 by producing an energizing signal for drain valve 24. The fixed-width output pulse from one-shot multivibrator 36 resets cycle timer 40. If cycle timer 40 fails to be reset within a predetermined time period established by cycle timer 40, it applies a trigger pulse to one-shot multivibrator 36 through OR gate 34 to initiate a valve-operation cycle. A cycle variable resistor 48 controls the interval between trigger pulses from cycle timer 40. A vane test input 42 is connected to valve driver 38. A cycle test input 44 is connected to a fourth input of OR gate 34.

Still referring to FIG. 3, when power is applied to controller 26, power-on reset 28 applies a short trigger pulse to one-shot multivibrator 36 through OR gate 34. One-shot multivibrator 36 responds by producing a fixed-width pulse having a width determined by the setting of multivibrator variable resistor 46. The fixed-width signal from one-shot multivibrator 36 causes valve driver 38 to open drain valve 24 for the period of the signal at the output of one-shot multivibrator 36. In addition to initiating a drain cycle, the leading edge of the signal from one-shot multivibrator 36 also resets cycle timer 40, which starts counting a new cycle period as determined by the setting of timer variable resistor 48. When allowed to count its full period without being reset by one-shot multivibrator 36, cycle timer 40 triggers one-shot multivibrator 36 through OR gate 34 to generate a fixed-width signal to valve driver 38 to open drain valve 24. Cyclic backup actuation of drain valve 24 in this manner permits periodic draining of liquid collection cell 20 regardless of the liquid level or in the event of electrode sensor 22 failure.

Electrode sensor 22 may be of any convenient type effective to change an electrical property when contacted by a liquid. For example, electrode sensor may be a thermistor which changes in resistance in a known manner with changes in temperature. The thermistor in electrode sensor 22 may receive a constant How of electricity from drain detector 32. When electrode sensor 22 is above the level of liquid in liquid collection cell 20, the thermistor is heated by the How of electricity. The elevated temperature of the thermistor affects the current passing therethrough, and/or the voltage thereacross. When the liquid in liquid collection cell 20 rises high enough to submerge electrode sensor 22, the liquid essentially acts as a heat sink, thereby reducing the temperature of the thermistor. Thus, the resistance of the thermistor, and the current and/or voltage changes in a manner detectable by drain detector 32. Since the structure of thermistors is completely known by those skilled in the art, and the structure of circuits for detecting a change in resistance, current or voltage across a thermistor are notoriously well known, it is believed that further description thereof is unnecessary.

Two externally applied test inputs are provided on controller 26. A valve test input 42 enables manual exercise and test of drain valve 24 through valve driver 38 for as long as valve test input 42 is active. A cycle test input 44 enables testing of cycle operation by initiating a drain cycle via a trigger signal to one-shot multivibrator 36 through OR gate 34. Energization of cycle test input 44 has the same effect as initiation of a drain cycle by electrode sensor 22. That is, one-shot multivibrator 36 is triggered into producing a fixed-width pulse which energizes drain valve 24 and resets cycle timer 40.

Referring to FIG. 4, a timing diagram of a sequence of events according to an embodiment of the invention is shown. When power source 30 is switched on at time t1, power-on reset 28 issues a trigger signal at point a in FIG. 4H through OR gate 34, making one-shot multivibrator 36 active during the period b-d as shown in FIG. 4C. The signal from one-shot multivibrator 36 enables valve driver 38 to open drain valve 24 as shown in period c-e of FIG. 4G. Cycle timer 40 is reset by the leading edge of the signal from one-shot multivibrator 36 at time b' of FIG. 4D. During the time from t1 to t2, the level of liquid in liquid collection cell 20 decreases rapidly as seen in period f-g of FIG. 4A. At time 12, or point d in FIG. 4C, the period of one-shot multivibrator 36 ends and drain valve 24 closes at point e in FIG. 4G. At time t2, the level of liquid in liquid collection cell 20 starts to rise again and at time 13 the rising liquid in liquid collection cell 20 comes in contact with electrode sensor 22 at point h of period g-h as shown in FIG. 4A. Drain detector 32 produces a trigger signal at point i in FIG. 4B. The trigger signal passes through OR gate 34 and triggers one-shot multivibrator 36 at point j in FIG. 4C. At the same time, cycle timer 40 is reset at point j' in FIG. 4D and drain valve 24 opens at point k in FIG. 4G, draining liquid from liquid collection cell 20. The liquid level in liquid collection cell 20 decreases during period h-l in FIG. 4A and reaches its lowest level at point l or time t4. At time t4 the preset time period of one-shot multivibrator 36 ends at point m in FIG. 4C, and drain valve 24 simultaneously closes at point n in FIG. 4G. From the point at l in FIG. 4A the level of liquid in liquid collection cell 20 starts rising again during period l-t in FIG. 4A.

Although not part of normal operation, the application of a test signal at valve test input 42 is shown at time t5. Drain valve 24 is energized only for the period p-q in FIG. 4E of the test signal, shown by r-s in FIG. 4G. Liquid is discharged from liquid collection cell 20 during time t5 to t6.

Resuming normal operation, during the period from t6 to t7, the rate of liquid accumulating in liquid collection cell 20 has decreased, due, for example to reduction in air usage, or changes in air temperature or humidity. The accumulation is slow enough to permit cycle timer 40, which was reset at time t3 in FIG. 4D point j, to complete its preset time period j'-v in FIG. 4D before the liquid level in liquid collection cell 20 has reached electrode sensor 22. In this case, cycle timer 40 initiates a drain cycle by sending an enabling signal to one-shot multivibrator 36 through OR gate 34 to cause drain valve 24 to open for the preset period of one-shot multivibrator 36 during time t7 to t8. After drain valve 24 closes at time t8, liquid starts accumulating again in liquid collection cell 20.

Also not part of normal operation, at time 19, an illustrative triggering test signal at point y of FIG. 4F is applied to cycle test input 44. The triggering test signal energizes one-shot multivibrator 36 at point z in FIG. 4C through OR gate 34 to start a drain cycle for the duration of one-shot multivibrator 36 period from time t9 to t10. Cycle timer 40 is reset by the leading edge of the pulse from one-shot multivibrator 36. A repetitive sequence of drain cycles, initiated by liquid level detection and/or cycle timer 40 timeouts, continues during air compressor system 10 operation.

One skilled in the art will recognize that control module 25 may be employed with other types of sensors. For example, control module 25 is capable of working with a float-type sensor of the prior art.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An automatic drain device for automatically draining accumulated liquid from an air tank, comprising:
    a liquid collection cell;
    means for permitting said liquid to drain into said liquid collection cell;
    a sensor in said liquid collection cell;
    an externally controllable drain valve;
    said drain valve being effective, when energized, to drain said liquid collection cell;
    said sensor including means for producing a predetermined change in an electrical property of said sensor when said sensor is contacted by said liquid;
    means for sensing said change in an electrical property, and for producing an output signal in response thereto;
    energizing means, responsive to said output signal, for energizing and drain valve for a first predetermined timer period commencing immediately upon said sensor being contacted by said liquid; and
    cycle timer means, responsive to the non-occurrence of said output signal for at least a second predetermined time period, to energize said drain valve for said first predetermined time period.

2. Apparatus according to claim 1, wherein said energizing means includes a one-shot multivibrator.

3. Apparatus according to claim 1, wherein said cycle timer means includes a timer, and means for resetting said time upon an occurrence of said output signal.

4. Apparatus according to claim 1, further including external means for permitting energizing said drain valve without affecting said cycle timer means.

5. Apparatus according to claim 1, further including external means for simulating an occurrence of said output signal, whereby energizing of said drain valve, and resetting said cycle time may be initiated from an external location.

6. Apparatus according to claim 1, further comprising means for adjusting a length of said first predetermined time.

7. Apparatus according to claim 1, further comprising means for adjusting a length of said second predetermined time.

8. Apparatus according to claim 1, wherein said sensor is an electrode sensor.

* * * * *